US009871616B2

(12) United States Patent
Bell et al.

(10) Patent No.: US 9,871,616 B2
(45) Date of Patent: Jan. 16, 2018

(54) ERROR DETECTION AND RECOVERY IN A DMX512 NETWORK (71) Applicant: ABL IP Holding LLC, Decatur, GA (US)

(72) Inventors: Robert Bell, Erin (CA); Kevin D. Loewen, Calgary, CA (US); Maurits van der Hoorn, Calgary (CA); Garrett Douglas, Calgary (CA)

(73) Assignee: ABL IP Holding LLC, Atlanta, GA (US)

( * ) Notice: Subject to any disclaimer, the term of this patent is extended or adjusted under 35 U.S.C. 154(b) by 71 days.

(21) Appl. No.: 15/166,846

(22) Filed: May 27, 2016

(65) Prior Publication Data
US 2016/0353321 A1 Dec. 1, 2016

Related U.S. Application Data (60) Provisional application No. 62/168,193, filed on May 29, 2015.

(51) Int. Cl.
H04L 1/00 (2006.01)
(52) U.S. Cl.
CPC .................... H04L 1/00 (2013.01)
(58) Field of Classification Search
CPC ........................................................ H04L 1/00
USPC ............... 370/216–228, 242–245, 248–251; 714/2–4.5, 40–46, 55–56
See application file for complete search history.

(56) References Cited

U.S. PATENT DOCUMENTS

| 5,008,879 | A | * | 4/1991 | Fischer | ............. H04L 12/40032 370/400 |
| 6,020,825 | A | | 2/2000 | Chansky et al. | |
| 6,175,201 | B1 | | 1/2001 | Sid | |
| 6,272,107 | B1 | * | 8/2001 | Rochberger | ........ H04L 12/5601 370/216 |
| 6,369,524 | B1 | | 4/2002 | Sid | |
| 6,545,586 | B1 | | 4/2003 | Belliveau | |
| 6,570,348 | B2 | | 5/2003 | Belliveau | |
| 6,577,080 | B2 | | 6/2003 | Lys et al. | |
| 6,761,470 | B2 | | 7/2004 | Sid | |

(Continued)

FOREIGN PATENT DOCUMENTS

CN 102036439 9/2014

OTHER PUBLICATIONS

"Professional Control LED Lighting," Overled Catalogue V.2.1, Jul. 2014, 60 pages.

(Continued)

Primary Examiner — Thai Hoang
(74) Attorney, Agent, or Firm — Kilpatrick Townsend & Stockton, LLP (57) ABSTRACT A DMX512 network may include two gateway devices or two ports of a single gateway device, which are connected to a number of DMX512 devices. Under normal operating conditions, one gateway device or one port transmits and the other gateway device or the other port receives DMX512 frames. If there is a connection failure, then both gateway devices or both ports may transmit DMX512 frames. Once the connection is restored, the system may detect the restoration and one of the gateway devices or one of the ports ceases to transmit DMX512 frames.

25 Claims, 7 Drawing Sheets (56) References Cited

U.S. PATENT DOCUMENTS

| | | | |
|---|---|---|---|
| 7,116,679 B1 * | 10/2006 | Ghahremani | H04L 45/302 |
| | | | 370/389 |
| 7,132,804 B2 | 11/2006 | Lys et al. | |
| 7,213,178 B1 * | 5/2007 | Prasad | H04L 41/0226 |
| | | | 709/223 |
| 7,394,210 B2 | 7/2008 | Ashdown | |
| 7,432,803 B2 | 10/2008 | Fails et al. | |
| 7,550,931 B2 | 6/2009 | Lys et al. | |
| 7,737,819 B2 | 6/2010 | Chansky et al. | |
| 7,990,082 B2 | 8/2011 | Dilley et al. | |
| 8,063,906 B2 | 11/2011 | Belliveau et al. | |
| 8,319,452 B1 | 11/2012 | Hamel et al. | |
| 8,434,898 B2 | 5/2013 | Sanfilippo et al. | |
| 8,513,891 B2 | 8/2013 | Hsieh | |
| 8,576,855 B2 * | 11/2013 | Sorrini | H04L 41/06 |
| | | | 370/395.6 |
| 8,581,513 B1 | 11/2013 | Reinoso | |
| 8,723,663 B2 | 5/2014 | Stahlkopf | |
| 8,742,673 B2 | 6/2014 | Campbell | |
| 8,779,695 B2 | 7/2014 | Saes et al. | |
| 8,810,359 B2 | 8/2014 | Campbell et al. | |
| 9,591,722 B2 | 3/2017 | Adenau | |
| 9,775,022 B1 * | 9/2017 | Sahu | H04W 8/183 |
| 2005/0289279 A1 | 12/2005 | Fails et al. | |
| 2013/0089157 A1 | 4/2013 | Chu et al. | |
| 2013/0293157 A1 | 11/2013 | Shea et al. | |
| 2014/0199071 A1 | 7/2014 | Kim et al. | |
| 2014/0223268 A1 | 8/2014 | Yseboodt et al. | |
| 2014/0245112 A1 | 8/2014 | Mills | |
| 2014/0265924 A1 | 9/2014 | Adenau | |
| 2014/0320022 A1 | 10/2014 | Lee | |
| 2015/0063360 A1 * | 3/2015 | Thakkar | H04L 45/745 |
| | | | 370/400 |
| 2015/0063364 A1 * | 3/2015 | Thakkar | H04L 12/66 |
| | | | 370/401 |
| 2015/0263899 A1 * | 9/2015 | Tubaltsev | H04L 45/02 |
| | | | 370/254 |
| 2015/0263946 A1 * | 9/2015 | Tubaltsev | H04L 45/586 |
| | | | 370/392 |
| 2015/0263952 A1 * | 9/2015 | Ganichev | H04L 45/745 |
| | | | 370/389 |
| 2015/0278137 A1 * | 10/2015 | Gan | G06F 13/387 |
| | | | 710/11 |
| 2016/0353321 A1 * | 12/2016 | Bell | H04L 1/00 |

OTHER PUBLICATIONS

"Running RDM," Technical Standards Program, Nov. 17, 2007, 35 pages.

* cited by examiner

ERROR DETECTION AND RECOVERY IN A DMX512 NETWORK

RELATED APPLICATION

This application claims priority to U.S. Provisional Patent Application No. 62/168,193 filed on May 29, 2015 entitled "DMX Network Error Detection and Recovery," which is incorporated herein in its entirety by reference.

TECHNICAL FIELD

The present application relates to the detection of and recovery from a connection failure in a network and in particular in a network that includes DMX512 devices.

BACKGROUND

It can be difficult to identify the location of a connection failure in a network, especially when the network includes a large number of devices or the locations or configurations of the devices make a visual inspection of the connections difficult. One example is a DMX512 network, such as that generally employed in theatrical lighting, touring productions, or other interior or exterior lighting installations. A typical DMX512 network includes a controller and a number of DMX512 devices, such as lighting fixtures, that are connected via cabling. The network may be susceptible to connection failures since it may be frequently set up and taken apart or subject to adverse environmental factors. When a connection failure occurs, it would be helpful if the network could detect the connection failure and take corrective action.

SUMMARY

Aspects of the invention provide systems and methods for detecting a connection failure in a DMX512 network and recovering from the failure. The recovery may include reconfiguring a gateway device to allow the network to continue operating. Once the connection failure is repaired, aspects of the invention detect the restoration of the network and return to normal operating mode.

In one aspect of the invention two gateway devices are connected to a number of DMX512 devices. Under normal operating conditions, one gateway device transmits and one gateway device receives DMX512 frames. If there is a connection failure, then both gateway devices transmit DMX512 frames. Once the connection is restored, one of the gateway devices ceases to transmit DMX512 frames. One benefit of detecting the restoration of the network and having one gateway device cease transmitting is that it avoids both gateway devices transmitting through the same set of devices at the same time.

In another aspect of the invention two ports of a single gateway device are connected to a number of DMX512 devices. Under normal operating conditions, one port transmits and one port receives DMX512 frames. If there is a connection failure, then both ports transmit DMX512 frames. The ports may alternate their transmissions. Once the connection is restored, one of the ports may cease to transmit DMX512 frames.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

Aspects of the invention support detecting a connection failure and switching to a backup mode to allow the network to continue to operate. Briefly described, aspects of the invention use two gateway devices or two ports of a single gateway device, which are connected to a number of DMX512 devices. Under normal operating conditions, one gateway device (or one port) transmits and the other gateway device (or the other port) receives DMX512 frames. If there is a connection failure, then both gateway devices (or both ports) transmit DMX512 frames. Once the connection is restored, one of the gateway devices (or one of the ports) ceases to transmit DMX512 frames.

Exemplary Operating Environment with Two Gateway Devices

Figure 1:
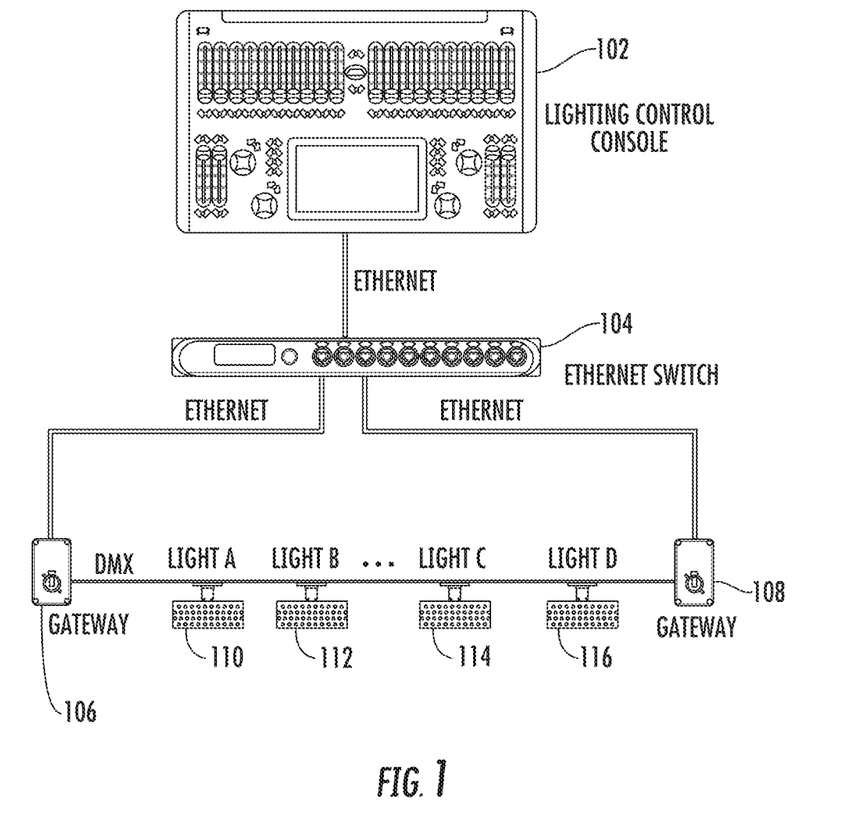
FIG. 1 is a block diagram illustrating an exemplary operating environment that includes two gateway devices.

FIG. 1 depicts an exemplary network with two gateway devices that may be used to implement aspects of the invention. The network includes a control console 102 which provides a user interface and controls the operation of devices 110-116. The control console is connected to a network switch 104. The switch is connected to two gateway devices 106, 108. Each gateway device is connected to a set of devices 110-116 which are connected in series. In one implementation, the control console 102 is a lighting control console, the network switch 104 is an Ethernet switch, and the devices are wired DMX512 devices. The gateway devices may communicate with the network switch using one communication protocol, such as an Ethernet protocol (e.g., ANSI E1.31 Streaming ACN, ArtNet, Pathport, Strand Shownet or ETC Net2 protocols) and with the devices using a different communication protocol, such as DMX512. Alternatively, the gateway devices may use DMX512 to communicate with both the network switch and the devices.

Under normal operating conditions when all connections and devices are operational, one of the gateway devices may be configured as the primary gateway device and the other may be configured as the secondary gateway device. Configuration of a gateway device may include assigning a DMX512 universe, assigning an IP address, specifying a network topology, identifying the device as a primary or secondary device, or setting an operating mode for the device. In one implementation, the devices may be configured using a software tool. In one example, gateway device 106 is configured as the primary gateway and gateway device 108 is configured as the secondary gateway. The control console 102 sends a packet to the network switch 104 and the network switch sends a copy of that packet to each of the gateways. The packet sent to the gateway devices from the network switch is referred to herein as a network packet. The network switch may send the network packet via a multicast message where the first and second gateway devices 106, 108 are in the same multicast group. The multicast groups may be defined at installation. The primary gateway 106 transmits a packet to the devices using the appropriate protocol. If the network switch is an Ethernet switch and the devices are DMX512 devices, then the network switch 104 may send a packet to the gateway devices using an Ethernet protocol and the gateway device 106 may transmit a DMX512 frame to the devices 110-116. The secondary gateway device 108 receives the DMX512 frame transmitted by the primary gateway device and may optionally confirm receipt to the primary gateway via a communication through the network switch to the primary gateway device.

Other network configurations are also possible. For example, the network switch may be any type of network device and may communicate with the gateway devices using any suitable protocol including, but not limited to, DMX512 or wireless protocols, such as 802.11, Zigbee, Bluetooth, Wifi, etc. Alternatively, the control console may be in direct communication with the gateway devices. In these configurations, a packet sent to the gateway devices from the network device is also referred to herein as a network packet. The gateway devices may communicate through the network device or may communicate directly with one another. Communications between the gateway devices may be out of band communications if they use a channel other than the channel used to transmit DMX512 frames.

Although not shown in FIG. 1, aspects of the invention may also operate in a network that includes a different number of devices or additional sets of serially connected devices between gateway device 106 and gateway device 108. If an additional set of devices is included, then the devices may be connected to different ports of the gateway devices shown in FIG. 1 and may be associated with a different DMX512 universe. Alternatively an additional set of devices may be connected to additional gateway devices. The additional gateway devices may be connected to the gateway devices shown in FIG. 1.

Exemplary Operations with Two Gateway Devices

If there is a connection failure in a portion of the network that includes the gateway devices 106, 108 and the devices 110-116, including their interconnections to each other, then the secondary gateway device may switch from standby mode to backup mode.

In one implementation, the network switch transmits a network packet to both gateway devices. Primary gateway device 106 receives the network packet and transmits a corresponding DMX512 frame to the devices 110-116. Secondary gateway device 108 receives the network packet and listens for a corresponding DMX512 frame. If the secondary gateway device does not receive the DMX512 frame within a predetermined period of time, then the system assumes that there is a connection failure or a DMX512 device failure that prevented the secondary gateway device from receiving the DMX512 frame. The secondary gateway device 108 then switches to backup mode. When configured in backup mode, the secondary gateway device receives a network packet from the network switch and transmits a DMX512 frame to the devices.

When the secondary gateway device is in backup mode, the network may operate as follows. The network switch 104 sends a network packet, such as an Ethernet packet, to the primary gateway device 106 and the secondary gateway device 108. Both the primary gateway device 106 and the secondary gateway device 108 transmit a corresponding DMX512 frame to the devices. In the case where there is a failure between device 112 and device 114, devices 110 and 112 receive the DMX512 frame transmitted by the primary gateway device 106 and devices 114 and 116 receive the DMX512 frame transmitted by the secondary gateway device 108. In the case where there is a wiring failure between device 110 and device 112, device 110 receives the DMX512 frame transmitted by the primary gateway device 106 and devices 112, 114 and 116 receive the DMX512 frame transmitted by the secondary gateway device 108.

The secondary gateway device may detect the repair of the network by listening for a frame from the primary gateway device. In one DMX512 implementation, the backup gateway listens for a transition during a Mark Before Break (MBB). The transition occurs when the primary gateway device is transmitting DMX512 frames. If the secondary gateway device detects a transition during a MBB, then it switches to standby mode. The secondary gateway device may optionally communicate the mode change to the primary device via the network switch.

Figure 2:
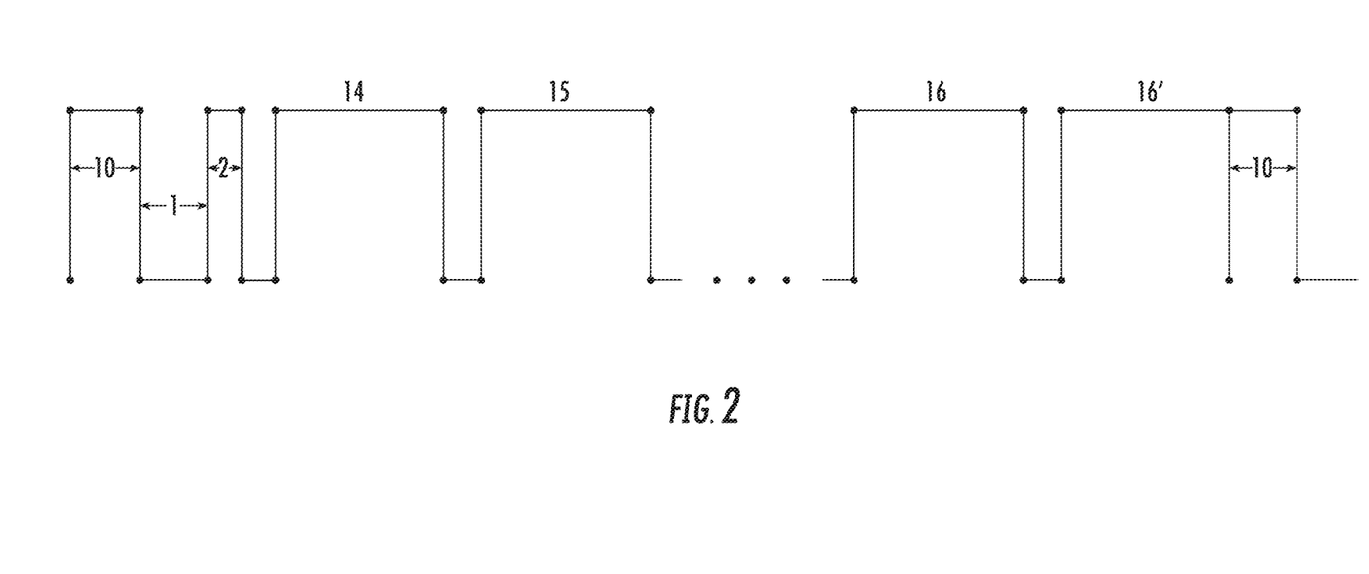
FIG. 2 is a timing diagram illustrating the timing for a DMX512 frame.

FIG. 2 illustrates a sample E1.11 DMX512 Timing Diagram, including a Mark Before Break 10. The timing diagram illustrates that a DMX512 frame includes a slot with a start code 14 followed by up to 512 slots of DMX data 15, 16, 16'. A MBB 10, space for break 1, and Mark After Break 2 precede the slot with the start code 14.

Figure 3:
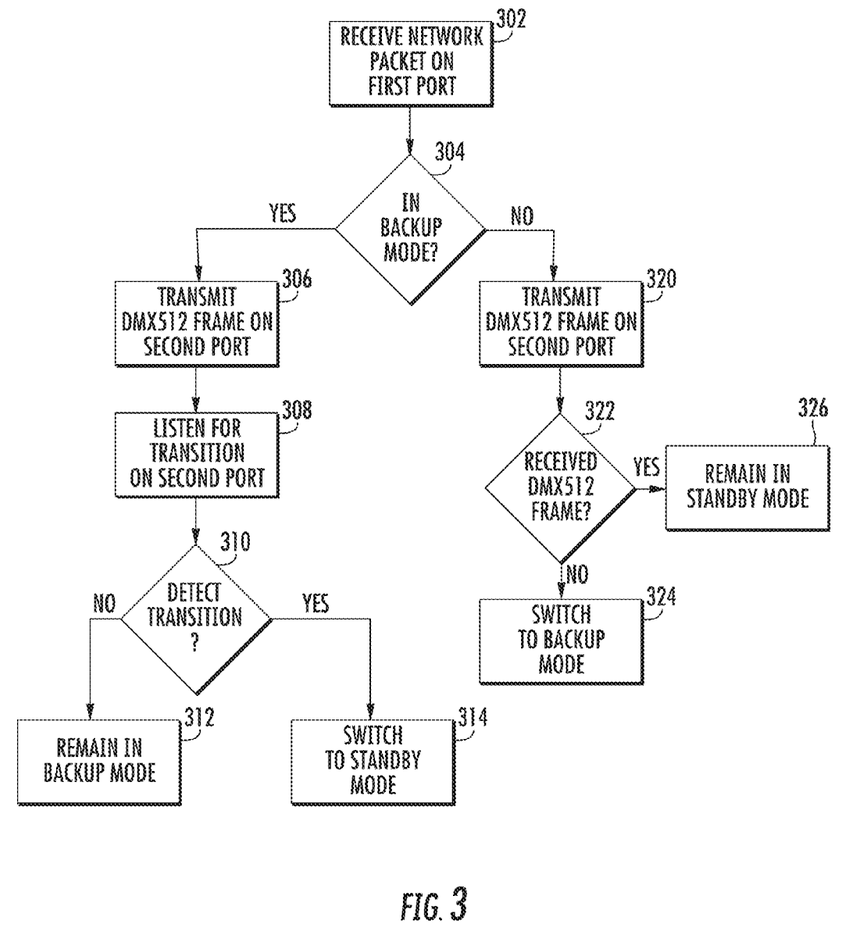
FIG. 3 is a flow chart illustrating an exemplary method for detecting a connection failure and entering a backup mode for a system with two gateway devices.

FIG. 3 illustrates one exemplary method of operation for a secondary gateway device. The gateway device receives a network packet at 302 from the network switch on a first port (Port 1). If the determination at 304 is that the gateway device is in standby mode, then the method proceeds via the No branch to 320. At 320, the gateway device listens for a DMX512 frame on a second port (Port 2). The gateway device determines whether a DMX512 frame was received on the second port within a predetermined period of time at 322. If a DMX512 frame is received on the second port within the predetermined period of time, then the gateway device remains in standby mode. If a DMX512 frame is not received within the predetermined period of time, then the method follows the No branch to 324 and the gateway device switches to backup mode. In one implementation, when the gateway device determines that the time elapsed since the last DMX512 frame was received is greater than the predetermined period of time, the gateway switches to backup mode. Once in backup mode the gateway device operates as described below in connection with 306-314.

If the determination at 304 is that the gateway device is in backup mode, then the method proceeds via the Yes branch to 306. The gateway device transmits a DMX512 frame that corresponds to the received network packet to the devices via its second port at 306. After the gateway device transmits the 512 data bytes of the DMX512 frame, it reverses the transceiver of its second port and listens for a transition during the MBB in 308. The gateway device determines whether any transitions were detected in 310. If the gateway device detects any transitions, then the method proceeds to 314 and the gateway device switches to standby mode. If the determination at 310 is that no transition was detected, then the method proceeds to 312 and the gateway device remains in backup mode.

In one implementation, the primary gateway operates in the same manner regardless of whether the other gateway device is in standby mode or backup mode. The primary gateway device receives a network packet from the network switch on its first port and transmits a DMX512 frame to the DMX512 devices on its second port.

If there are multiple DMX512 universes on the network, then the gateway devices only transmit a DMX512 frame when the received network packet is associated with their DMX512 universe(s).

Figure 4:
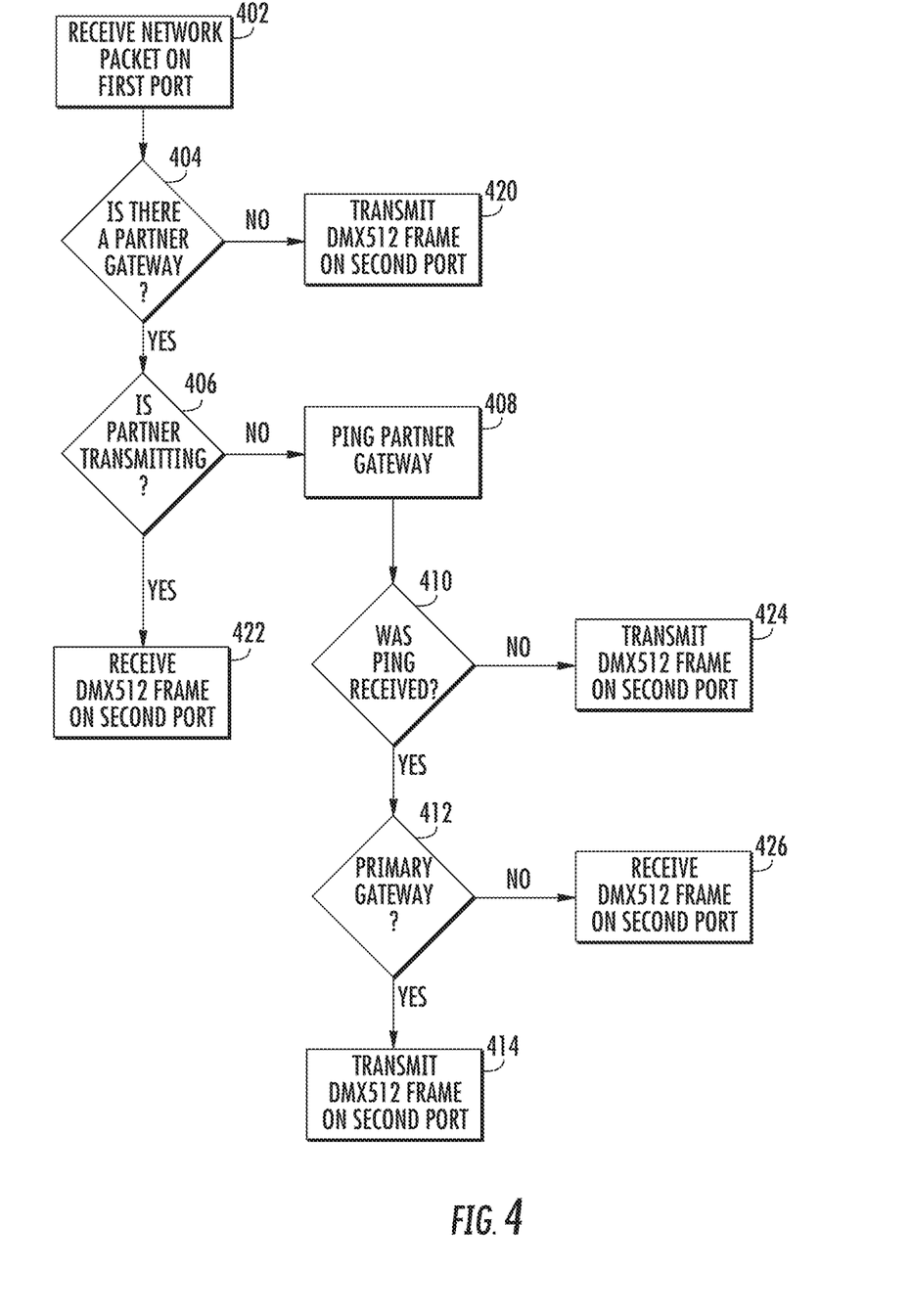
FIG. 4 is a flow chart illustrating another exemplary method for detecting a connection failure and entering a backup mode for a system with two gateway devices.

Another exemplary method of operation assumes that both gateway devices are ANSI E1.11 DMX512 compliant in that they are capable of transmitting and recognizing a non-zero start code. The gateway devices use the non-zero start code to send data other than lighting control data between the gateway devices via the path that includes the DMX512 devices. In this method the gateway devices arbitrate between themselves to determine which device will be the primary device.

Initially, the gateway devices are configured as devices within a loop topology, such as that shown in FIG. 1 and assigned a DMX512 universe. The first gateway device 106 receives a network packet from the network switch at 402 on its first port. When the first gateway device is in a loop topology, it determines whether there is a partner gateway device in its universe on the network at 404. In one implementation, it determines whether there is another gateway device in its multicast group. Gateway devices that are configured in the same loop and have the same DMX512 universe are assigned to the same multicast group. For example, gateway devices 106 and 108 in FIG. 1 are in the same multicast group. If there is no partner universe, then the method follows the No branch to 420 and the first gateway device transmits a DMX512 frame to the devices.

If there is second gateway device in the multicast group, then the method proceeds along the Yes branch to 406 where the first gateway device determines whether the second gateway device is transmitting. In one implementation, the first gateway device sends a query to the second gateway device via the network switch and the second gateway device responds via the network switch. In other implementations, other forms of out of band communications may be used, such as communications via raw fiber or a wireless channel.

If the first gateway device determines that the second gateway device is transmitting, then the method proceeds along the Yes branch to 422 and the first gateway device configures its second port to receive a DMX512 frame from the second gateway device. In this manner, the first gateway device becomes a secondary gateway device.

If the second gateway device is not transmitting, then the method follows the No branch to 408 and the first gateway device pings the second gateway device on the RS-485 layer. In one implementation, the first gateway device sends a DMX512 frame to the second gateway device with a non-zero start code via the path that includes the DMX512 devices. The transmission of the DMX512 frame to the second gateway device may happen at predetermined intervals, instead of each time that the first gateway device receives a network packet. The first gateway device waits for an acknowledgement from the second gateway device to determine whether the second gateway device received the ping within a predetermined amount of time at 410. The acknowledgement from the second gateway device may be sent via the out of band channel. In one implementation, the first gateway device receives an indication from the network switch indicating whether the second gateway device received the ping.

If the first gateway device determines at 410 that the second gateway received the ping, then the gateway devices arbitrate to determine which gateway device is the primary gateway device at 412. When the second gateway device receives the ping, the system assumes that the network is intact. In one implementation, the gateway devices arbitrate by sending and receiving communications via the network switch. The gateway devices may use their serial numbers to determine which device is the primary gateway device. For example, the second gateway device may communicate its serial number to the first gateway device and the first gateway device may compare its serial number to the serial number of the second gateway device. The first gateway device may determine that the gateway device with the lower serial number is the primary gateway device. However, the method is not limited to the use of serial numbers and may use other information to determine which device is the primary gateway device, including IP addresses, MAC addresses, a user specified topology, or the device that initiated the first handshake.

If the first gateway device determines that it is the primary gateway device, then the method follows the Yes branch to 414 and the first gateway device transmits a DMX512 frame on its second port. If the first gateway device determines that it is the secondary gateway device, then the method follows the No branch to 426 and the first gateway device prepares its second port to receive a DMX512 frame from the primary gateway device.

The second gateway device also follows the method illustrated in FIG. 4 so that both gateway devices are executing the method at the same time.

Exemplary Operating Environment with a Single Gateway Device

Figure 5:
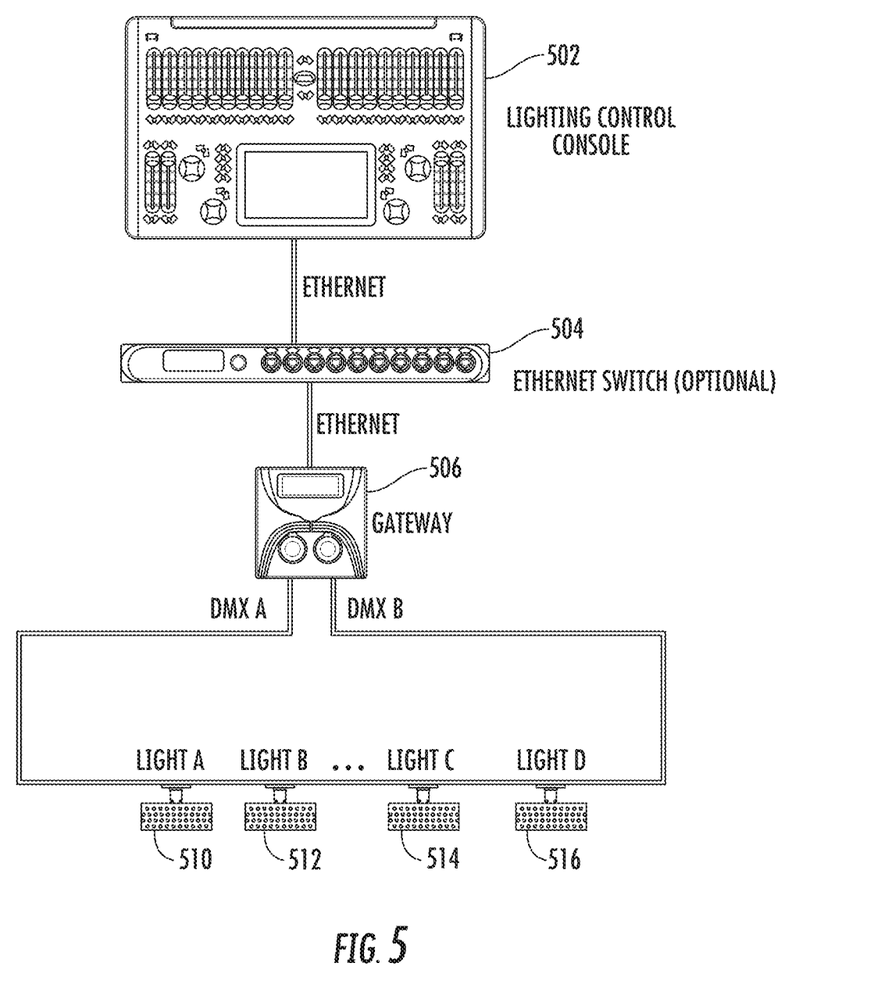
FIG. 5 is a block diagram illustrating an exemplary operating environment that includes one gateway device.

FIG. 5 depicts an exemplary network with a single gateway device that may be used to implement aspects of the invention. A control console 502 provides a user interface and controls the operation of the devices 510-516 on the network. The control console is connected to a network switch 504. The switch is connected to a gateway device 506. The gateway device is connected to a set of serially connected devices 510-516 by connecting one port of the gateway device to the first device 510 and another port of the gateway device to the last device 516. In one implementation, the control console 502 is a lighting control console, the network switch 504 is an Ethernet switch, and the devices 510-516 are DMX512 devices. The gateway device 506 may communicate with the network switch using one communication protocol, such as an Ethernet protocol or 802.11, and with the devices using a different communication protocol, such as DMX512. Alternatively, the gateway device may use DMX512 to communicate with both the network switch and the devices.

Under normal operating conditions when all connections and devices are operational, one port of the gateway device is configured as the primary port and the other is configured as the secondary port. In one example, the first port is connected to the network switch, the second port is configured as the primary port, and the third port is configured as the secondary port. The control console 502 sends a packet to the network switch 504 and the network switch relays the packet to the gateway device 506. The gateway device is configured for a ring topology and transmits a DMX512 frame to the devices via its second port and receives the DMX512 frame via its third port.

Although not shown in FIG. 5, aspects of the invention may also operate in a network that includes an additional DMX512 universe on an additional pair of ports on the gateway device. If so, then when the gateway device receives the network packet, it determines which ports should be used so that the correct set of devices receives the DMX512 frame.

Other exemplary networks may not include the network switch 504, but instead use a crossover cable. Alternatively, the control console may be configured to include the DMX512 ports. For example, an exemplary control console may include a main processor and a satellite processor. The satellite processor controls two DMX512 ports on the console. The main processor may function in a manner similar to a network device, as described herein and the satellite processor and the DMX512 ports may function in a manner similar to the gateway devices described herein. Communications between the processors may use any suitable protocol, and in one implementation use TCP/IP. The satellite processor may control the two DMX512 ports to operate using any of the methods described herein, including the methods illustrated in FIGS. 3, 4 and 6 and the modifications discussed herein.

The communications between the gateway device and a network device, such as a network switch, a control console, or other network device, may use any suitable protocol including, but not limited to, DMX512 and wireless protocols, such as 802.11, Zigbee, Bluetooth, Wifi, etc.

Exemplary Operations of a Network with a Single Gateway Device

If there is a connection failure in a portion of the network that includes the devices 510-516, as well as their interconnections to each other and to the gateway device, then the gateway device may switch from normal mode to backup mode. In backup mode, the gateway device configures both its second and third ports to transmit DMX512 frames, i.e., they are configured as a redundant pair of ports.

In one implementation, the network switch 504 transmits a network packet to the gateway device. The gateway device 506 receives the network packet on its first port and transmits a corresponding DMX512 frame on its second port (DMX A). The gateway device listens for the DMX512 frame on its third port (DMX B). If it does not receive the DMX512 frame on its third port within a predetermined period of time, then the gateway device 506 switches to backup mode. When it does not receive the DMX512 frame, the system assumes that there is a connection failure in the network that prevented the DMX512 frame from reaching the third port.

With the gateway device 506 in backup mode, the network of FIG. 5 may operate as follows. The network switch 504 sends a network packet to the gateway device 506. After receiving the packet, the gateway device increments a packet counter. When the packet counter is an odd number, the gateway device transmits a DMX512 frame that corresponds to the received packet to the devices 510-516 via its second port. The gateway device listens on the third port. If the gateway device receives the DMX512 frame transmitted on the second port at its third port, then the gateway device determines that the network connections are operational and returns to normal mode. If the gateway device determines that the third port did not receive the DMX512 frame, then the gateway device determines that there is still a failure in the network and remains in backup mode.

When the packet counter is an even number, the gateway device transmits a DMX512 frame that corresponds to the received packet to the devices 510-516 via its third port. The gateway device listens on its second port. If the gateway device receives the DMX512 frame transmitted on the third port at its second port, then the gateway device determines that the network connections are operational and returns to normal mode. If the gateway device determines that the second port did not receive the DMX512 frame, then the gateway device determines that there is still a failure in the network and remains in backup mode.

In backup mode since both the second and the third ports transmit DMX512 frames, the network remains operational. In the case where the failure was between device 512 and device 514, devices 510 and 512 receive the DMX512 frame transmitted by the second port and devices 514 and 516 receive the DMX512 frame transmitted by the third port. Even though the devices may only receive every other frame, the network remains operational since the frequency of the frames may be sufficient for operation. For example, when the gateway device is in normal mode it may transmit DMX512 frames at a rate between 40 Hz. When there is a connection failure and the gateway device is in backup mode, the DMX512 devices controlled by the second port may receive DMX512 frames at a rate of approximately 20 Hz and the DMX512 devices controlled by the third port may receive DMX512 frames at approximately 20 Hz. DMX512 devices that are compliant with E1.11 are able to operate satisfactorily at 20 Hz, so the system remains operational.

Figure 6:
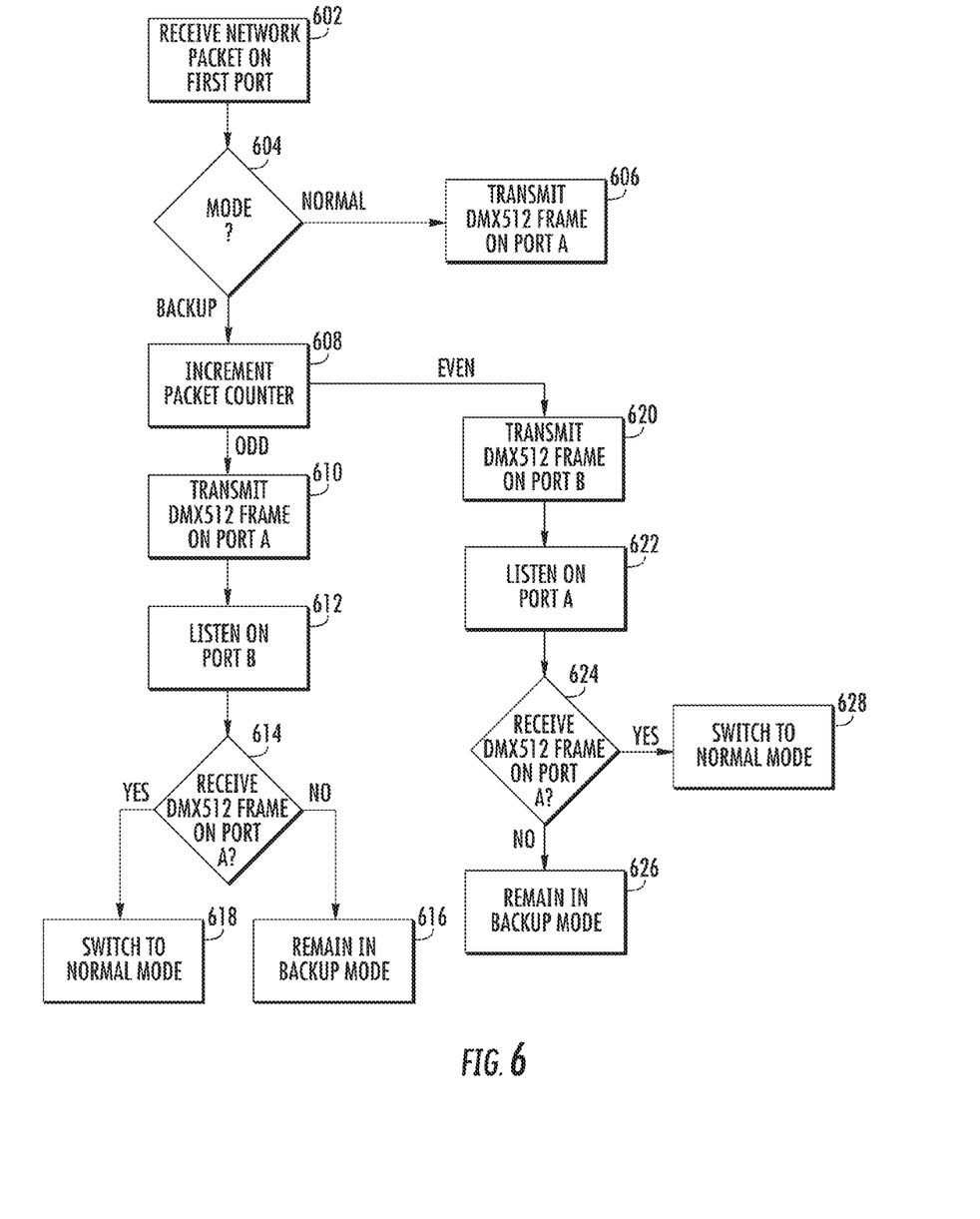
FIG. 6 is a flow chart illustrating an exemplary method for detecting a connection failure and entering a backup mode for a system with one gateway device.

FIG. 6 illustrates an exemplary method for the gateway device of FIG. 5. The gateway device receives a network packet at 602 on its first port. If the gateway device determines that it is in normal mode at 604, then the method proceeds to 606 and the gateway device transmits a DMX512 frame on its second port. If the gateway device determines that it is in backup mode at 604, then the method proceeds to 608 and the device increments a packet counter.

If the packet counter is an odd number, then the method proceeds from 608 to 610 and the gateway device transmits a DMX512 frame on its second port (Port A). The gateway device listens on its third port (Port B) at 612 and determines whether the third port receives the DMX512 frame at 614. If the third port receives the DMX512 frame, then the Yes branch is followed to 618 and the gateway device switches to normal mode. If the third port does not receive the DMX512 frame, then the No branch is followed to 616 and the gateway device remains in backup mode. Typically, the gateway device determines whether the DMX512 frame is received within a predetermined period of time.

If the packet counter is an even number, then the method proceeds from 608 to 620 and the gateway device transmits a DMX512 frame on its third port. The gateway device listens on its second port at 622 and determines whether the second port receives the DMX512 frame at 624. If the second port receives the DMX512 frame, then the Yes branch is followed to 628 and the gateway device returns to normal mode. If the second port does not receive the DMX512 frame, then the No branch is followed to 626 and the gateway device remains in backup mode.

In another exemplary method the gateway device operates in a single mode. Both the second and third ports are configured to transmit alternate DMX512 frames. This method differs from the method described above in that the second and third ports do not listen for DMX512 frames from the other port.

Exemplary Gateway Device

Figure 7:
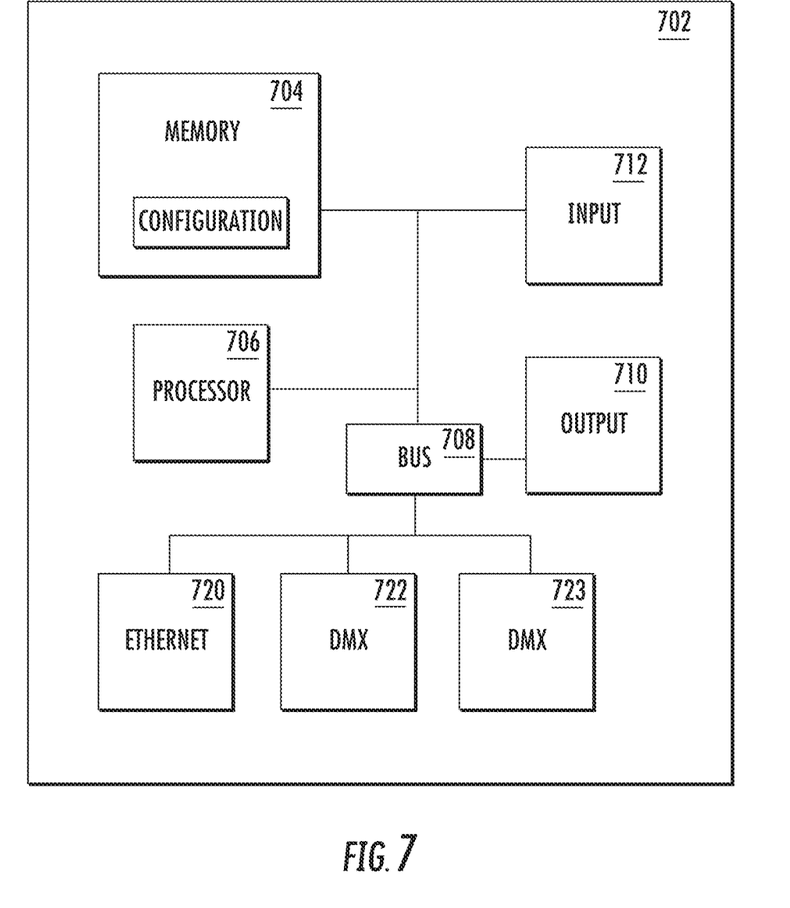
FIG. 7 is a block diagram illustrating an exemplary gateway device.

FIG. 7 illustrates an exemplary gateway device 702. The gateway device may include one or more processors, such as processor 706. Non-limiting examples of the processors include a microprocessor, a field-programmable gate array ("FPGA") an application-specific integrated circuit ("ASIC"), or other suitable processing device. The processor 706 may be communicatively coupled to a computer-readable media, such as a memory device 704. The memory device may store program code that, when executed by the processor, causes the processor to perform operations described herein. The memory device may include one or more non-transitory computer-readable media such as (but not limited to) an electronic, optical, magnetic, or other storage device capable of providing a processor with computer-readable instructions. Non-limiting examples of such optical, magnetic, or other storage devices include read-only memory ("ROM") device(s), random-access memory ("RAM") device(s), magnetic storage, memory chip(s), an ASIC, configured processor(s), optical storage device(s), or any other medium from which a computer processor can read instructions. The program code may include processor-specific instructions generated by a compiler and/or an interpreter from code written in any suitable computer-programming language.

The gateway device 702 may also include one or more buses 708. Each bus may communicatively couple one or more components of the gateway device and communicate input events and output events among components of the gateway device. The gateway device may include one or more input devices 712, such as a key pads, knob, or switch, and one or more output devices 710, such as a display device. Any input or output devices may be communicatively coupled to the bus. The communicative coupling can be implemented via any suitable manner (e.g., a connection via a printed circuit board, connection via a cable, communication via wireless transmissions, etc.). Non-limiting examples of an output device include a display device, display screen, indicator lamps, or any other device that can be used to display or otherwise present outputs.

The gateway device may also include one or more ports or communication interfaces 720, 722, 724 for communicating with other devices. Non-limiting examples of the communication interfaces include DMX512 ports, Ethernet ports and wireless ports. Although FIG. 7 illustrates two DMX512 ports and one Ethernet port, the device may have other numbers of ports or all of the ports may support the same protocol, such as multiple DMX512 ports. The gateway device may be powered by an internal or external power source. In one implementation, the gateway device receives power via its connection to the network switch. The gateway device may be similar to the Pathport DIN-mountable nodes offered by Pathway Connectivity.

General Considerations

The system discussed herein is not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system for controlling DMX512 devices on a network comprising:

a first gateway device; and a second gateway device;

wherein each gateway device includes a first port in communication with a network device and a second port connected to one of a plurality of DMX512 devices, wherein the plurality of DMX512 devices are connected in series and the second port of the first gateway device is connected to a first device of the plurality of DMX512 devices and the second port of the second gateway device is connected to a last DMX512 device of the plurality of DMX512 devices;

wherein when the second gateway device operates in a standby mode, the second gateway device is configured to:

receive a first network packet on the first port of the second gateway device from the network device, wherein the first network packet uses a first communication protocol;

determine whether a frame corresponding to the first network packet was received on the second port of the second gateway device within a predetermined period of time; and when the determination is that no frame was received, enter a backup mode and transmit a backup frame on the second port to the last DMX512 device, wherein the backup frame uses a second communication protocol.

2. The system of claim 1, wherein the first gateway device is configured to:

receive the first network packet on the first port of the first gateway device from the network device; and transmit the frame on the second port to the first DMX512 device, wherein the frame uses the second communication protocol.

3. The system of claim 1, wherein the second gateway device is further configured to:
listen on the second port for a transition; and
when the transition is detected, enter the standby mode.

4. The system of claim 3, wherein the first gateway device is configured to:
receive a second network packet on the first port from the network device;
and
transmit a second frame on the second port to the first DMX512 device,
wherein the second frame uses the second communication protocol,
wherein the transmission of the frame on the second port of the first gateway device results in the transition at the second port of the second gateway device.

5. The system of claim 1, wherein the second gateway device is further configured to:
receive a second network packet on the first port from the network device,
wherein the second network packet uses the first communication protocol; and
transmit a second backup packet on the second port to the last DMX512 device, wherein the second backup packet uses the second communication protocol.

6. The system of claim 1, wherein the first communication protocol is Ethernet, 802.11, Zigbee, Bluetooth, or Wifi and the second communication protocol is DMX512.

7. The system of claim 1, wherein the first communication protocol and the second communication protocol are DMX512.

8. The system of claim 1, wherein the network device is a network switch or a control console.

9. The system of claim 1, wherein the network device corresponds to a processing device within a lighting control console, the first gateway device corresponds to a first DMX512 port on the lighting control console, and the second gateway device corresponds to a second DMX512 port on the lighting control console.

10. A method of controlling DMX512 devices on a network comprising:
receiving a first network packet on a first port from a network device, wherein the first network packet uses a first communication protocol;
while in a standby mode, determining whether a frame was received on a second port within a predetermined period of time;
when the determination is that no frame was received on the second port, then entering a backup mode and transmitting a backup frame on the second port, wherein the backup frame uses a second communication protocol;
receiving a second network packet on the first port from the network device, wherein the second network packet uses the first communication protocol;
transmitting a second backup frame on the second port, wherein the second backup frame uses the second communication protocol;
listen on the second port for a transition; and
when the transition is detected, entering the standby mode.

11. The method of claim 10, further comprising:
when no transition is detected, remaining in backup mode.

12. The method of claim 10, wherein the first communication protocol is Ethernet, 802.11, Zigbee, Bluetooth, or Wifi and the second communication protocol is DMX512.

13. The method of claim 10, wherein the first communication protocol and the second communication protocol are DMX512.

14. The method of claim 10, wherein the second communication protocol is DMX512 and the transition is a transition during a mark before break period of a DMX512 frame.

15. A method for controlling DMX512 devices on a network comprising:
receiving a first network packet on a first port of a gateway device from a network device, wherein the first network packet uses a first communication protocol, wherein a second port of the gateway device is connected to a first DMX512 device of a plurality of DMX512 devices connected in series, and a third port of the gateway device is connected to a last DMX512 device of the plurality of DMX512 devices;
incrementing a packet counter;
when the packet counter is odd, transmitting a first frame on the second port to the first DMX512 device using a second communication protocol; and
when the packet counter is even, transmitting a second frame on the third port to the last DMX512 device using the second communication protocol.

16. The method of claim 15, further comprising:
after transmitting a first frame on the second port to the first DMX512 device, listening on the third port; and
when the first frame is received on the third port, configuring the gateway device to operate in a standby mode.

17. The method of claim 15, further comprising:
receiving a second network packet on the first port of the gateway device;
incrementing the packet counter;
when the packet counter is odd and the gateway device is configured to operate in standby mode, the gateway device:
transmits the second frame on the second port to the first DMX512 device using the second communication protocol;
determines whether the second frame is received on the third port within a predetermined period of time;
when the determination is that the second frame was not received on the third port within the predetermined period of time, configures the gateway device to operate in a backup mode; and
when the determination is that the second frame was received on the third port within the predetermined period of time, remains in standby mode.

18. The method of claim 15, wherein the first communication protocol is Ethernet, 802.11, Zigbee, Bluetooth, or Wifi and the second communication protocol is DMX512.

19. The method of claim 15, wherein the first communication protocol and the second communication protocol are DMX512.

20. A system for controlling DMX512 devices on a network comprising:
a gateway device having a first port in communication with a network device, a second port connected to a first DMX512 device of a plurality of DMX512 devices connected in series, and a third port connected to a last DMX512 device of the plurality of DMX512 devices;
the network switch; and
the plurality of DMX512 devices,
wherein when the gateway device operates in a backup mode, the gateway device:

receives a network packet from the network device using a first communication protocol and increments a packet counter;

when the packet counter is odd, the gateway device:

transmits a first frame on the second port to the first DMX512 device using a second communication protocol;

listens on the third port; and when the first frame is received on the third port, configures the gateway device to operate in a standby mode;

when the packet counter is even, the gateway device:

transmits a second frame on the third port to the last DMX512 device using the second communication protocol;

listens on the second port; and when the second frame is received on the second port, configuring the gateway device to operate in the standby mode.

21. The system of claim 20, wherein the gateway device is further configured to:

when the gateway device operates in standby mode, the gateway device:

transmits the first frame on the second port to the first DMX512 device using the second communication protocol;

determines whether the first frame is received on the third port within a predetermined period of time;

when the determination is that the first frame was not received on the third port, configuring the gateway device to operate in the backup mode; and when the determination is that the first frame was received on the third port, the gateway device remains in standby mode.

22. The system of claim 20, wherein the first communication protocol is Ethernet, 802.11, Zigbee, Bluetooth, or Wifi and the second communication protocol is DMX512.

23. The system of claim 20, wherein the first communication protocol and the second communication protocol are DMX512.

24. The system of claim 20, wherein the network device is a network switch or a control console.

25. The system of claim 20, wherein the network device corresponds to a processing device within a lighting control console, the first port corresponds to a first DMX512 port on the lighting control console, and the second port corresponds to a second DMX512 port on the lighting control console.

* * * * *